United States Patent
Bender et al.

(10) Patent No.: US 6,611,629 B2
(45) Date of Patent: *Aug. 26, 2003

(54) CORRECTING CORRELATION ERRORS IN A COMPOSITE IMAGE

(75) Inventors: Blake R. Bender, Hillsboro, OR (US); Steven E. Barile, Hillsboro, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,289

(22) Filed: Nov. 3, 1997

(65) Prior Publication Data

US 2002/0097920 A1 Jul. 25, 2002

(51) Int. Cl.[7] .................................................. G06K 9/64
(52) U.S. Cl. ...................... 382/278; 382/284; 382/294; 348/36; 348/588
(58) Field of Search .................. 382/278, 294, 382/284; 345/435; 348/36, 42, 44, 218, 222; 375/240

(56) References Cited

U.S. PATENT DOCUMENTS

| | | | |
|---|---|---|---|
| 4,195,911 A | 4/1980 | Bougon et al. | 350/171 |
| 5,130,794 A | 7/1992 | Ritchey | 358/87 |
| 5,262,867 A | 11/1993 | Kojima | 358/209 |
| 5,392,388 A | 2/1995 | Gibson | 395/159 |
| 5,394,520 A * | 2/1995 | Hall | 345/435 |
| 5,495,576 A | 2/1996 | Ritchey | 395/125 |
| 5,563,650 A | 10/1996 | Poelstra | 348/36 |
| 5,646,679 A * | 7/1997 | Yano et al. | 348/47 |
| 5,657,402 A | 8/1997 | Bender et al. | 382/284 |
| 5,668,595 A | 9/1997 | Katayama et al. | 348/218 |
| 5,782,766 A | 7/1998 | Weng et al. | 600/443 |
| 5,825,044 A * | 10/1998 | Allen et al. | 250/557 |
| 5,920,657 A | 7/1999 | Bender et al. | 382/284 |
| 5,999,662 A * | 12/1999 | Burt et al. | 382/284 |
| 6,005,987 A * | 12/1999 | Nakamura et al. | 382/294 |
| 6,038,349 A * | 3/2000 | Cullen | 382/294 |
| 6,044,181 A * | 3/2000 | Szeliski et al. | 382/284 |
| 6,081,551 A * | 6/2000 | Etoh | 375/240 |
| 6,133,943 A | 10/2000 | Needham | |

* cited by examiner

*Primary Examiner*—Bhavesh Mehta
*Assistant Examiner*—Gregory Desiré
(74) *Attorney, Agent, or Firm*—Blakely, Sokoloff, Taylor & Zafman LLP

(57) ABSTRACT

The invention, in one embodiment, is a method for correcting errors in the correlation of a first constituent image and a second constituent image transferred into a composite image at a first and a second correlation offset, respectively. The method includes identifying the first and second constituent images; ascertaining the correlation offset of at least one of the first and second images; and manually correcting the ascertained correlation offset to eliminate the error.

59 Claims, 11 Drawing Sheets

CORRECTING CORRELATION ERRORS IN A COMPOSITE IMAGE

BACKGROUND OF THE INVENTION

1. Field of the Invention

This invention relates generally to generating composite images and, more particularly, to correcting correlation errors in a composite image.

2. Description of the Related Art

The generation of composite images has many applications. One such application is the generation of panoramic images. Panoramic images can be generated from a number of separate images joined together to create a composite image that simulates a panoramic photograph of the same subject matter. For instance, a camera can be mounted on a tripod and rotated through a predetermined range of motion. As the camera is rotated, photographs may be taken periodically, with efforts to ensure that the images in sequential photographs overlap. The images in the individual photographs can then be joined to produce a panoramic image similar to what could have been acquired if a panoramic photograph had been originally taken.

One aspect of generating composite images is the alignment of the subject matter in the constituent images being joined. The subject matter of a first image must be accurately aligned with the subject matter of the second image at the seam where they are to be joined to prevent unattractive discontinuities in the composite image. This is particularly difficult in some contexts, such as when there are large periods of time between when the constituent images are captured, when there are significant variations in lighting conditions between constituent images, and where the images lack significant distinguishing features on which the alignment can be based.

One technique for aligning the subject matter in constituent images for placement in a composite image is known as "correlation." Computers greatly facilitate correlation and a number of computer-implemented correlation techniques are known. One exemplary correlation technique is detailed in *Digital Image Processing,* by William K. Pratt (1991, 2d ed.) and discussed further below. However, these computer-implemented correlation techniques are also subject to problems in the contexts discussed above.

For instance, a second constituent image is frequently taken under brighter or darker lighting conditions than was the first image when the images are captured outdoors. In such situations, one may discern the seam in the composite photograph from the varied lighting conditions on either side of the seam. Another condition that may be called "stuttering" is illustrated in FIG. 1. Because of the lack of distinguishing features in the first and second constituent images 10 and 12, the composite image 18 includes an artifact 24 ghosting the desired image 12 and evidencing a poor correlation. Such a correlation error readily marks the seam 20, and is therefore readily detectable by the human eye, aesthetically unpleasant, and unacceptable for most uses of the resulting composite image.

The present invention is directed to overcoming, or at least reducing the effects of, one or more of the problems set forth above.

SUMMARY OF THE INVENTION

The invention, in one embodiment, is a method for correcting errors in the correlation of a first constituent image and a second constituent image transferred into a composite image at a first and a second correlation offset, respectively. The method includes identifying the first and second constituent images; ascertaining the correlation offset of at least one of the first and second images; and manually correcting the ascertained correlation offset to eliminate the error.

BRIEF DESCRIPTION OF THE DRAWINGS

Other objects and advantages of the invention will become apparent upon reading the following detailed description and upon reference to the drawings in which.

Figure 1:
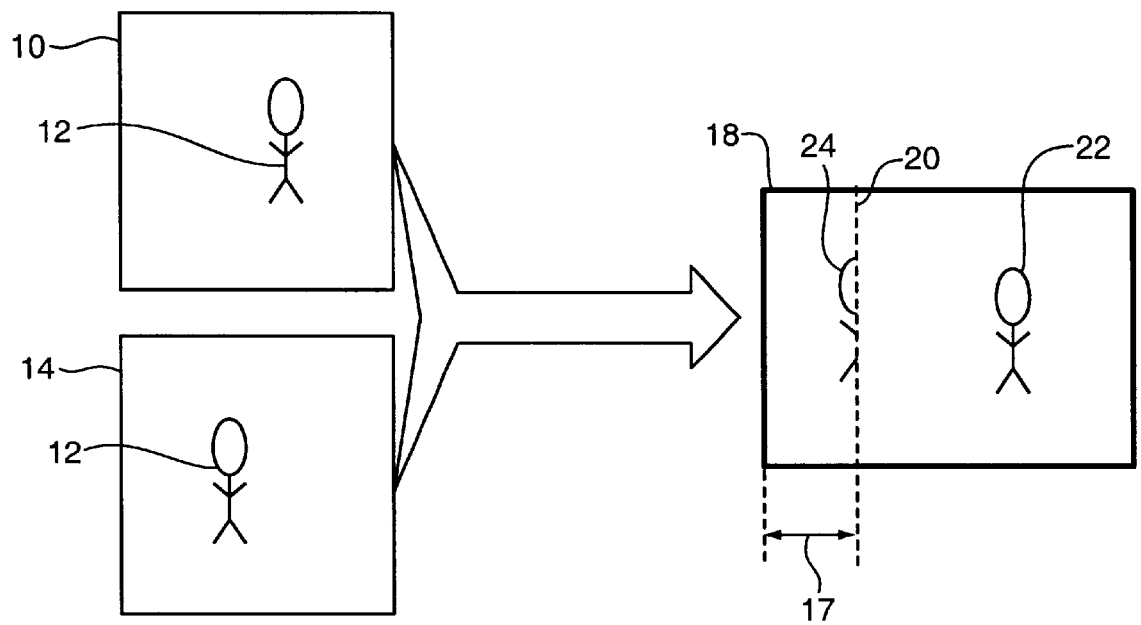
FIG. 1 illustrates the result of a common correlation error.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would nevertheless be a routine undertaking for those of ordinary skill in the art having the benefit of this disclosure.

FIG. 1 illustrates a common correlation error frequently encountered in the generation of composite images. A first constituent image 10 including a subject 12 is correlated to a second image 14 also including the subject 12. Note that the subject 12 is positioned relative to the bounds of the second constituent image 14 differently than it is relative to the bounds of the first constituent image 10. The first and second constituent images 10 and 14 are correlated and pasted one on top the other to generate the composite image 18.

The constituent images 10 and 14 are pasted at a point determined by a "correlation offset." The correlation offset is a measure of the point in the composite image 18 in which the respective constituent image is pasted into the composite image 18. The correlation offset may be measured absolutely from some predetermined point. For instance, in the embodiment illustrated in FIG. 1, the second constituent image 14 is pasted on top the first constituent image 10. The first constituent image 10, forming the left-most edge of the composite image 18, may be said to have been pasted at a correlation offset of zero measured from the left-most edge of composite image 18. The second constituent image 14, then, is pasted at a correlation offset 17 from the same point. Note that the offset may, in some embodiments, also be measured relative to a series of points. For instance, a subsequent constituent image may be pasted at an offset relative to the point where the preceding constituent image was pasted. The correlation offset is typically measured in pixels, but the invention contemplates measurement in any suitable measure known to the art.

The composite image 18 includes a seam 20 at which the constituent images 10 and 14 were pasted together. Because of the correlation error, the composite image 18 includes the subject 12 shadowed by a ghosted artifact 24 instead of a single subject 12 as found in each of the constituent images 10 and 14. Note that the correlation error in FIG. 1 is exaggerated for purposes of illustration.

Figure 2:
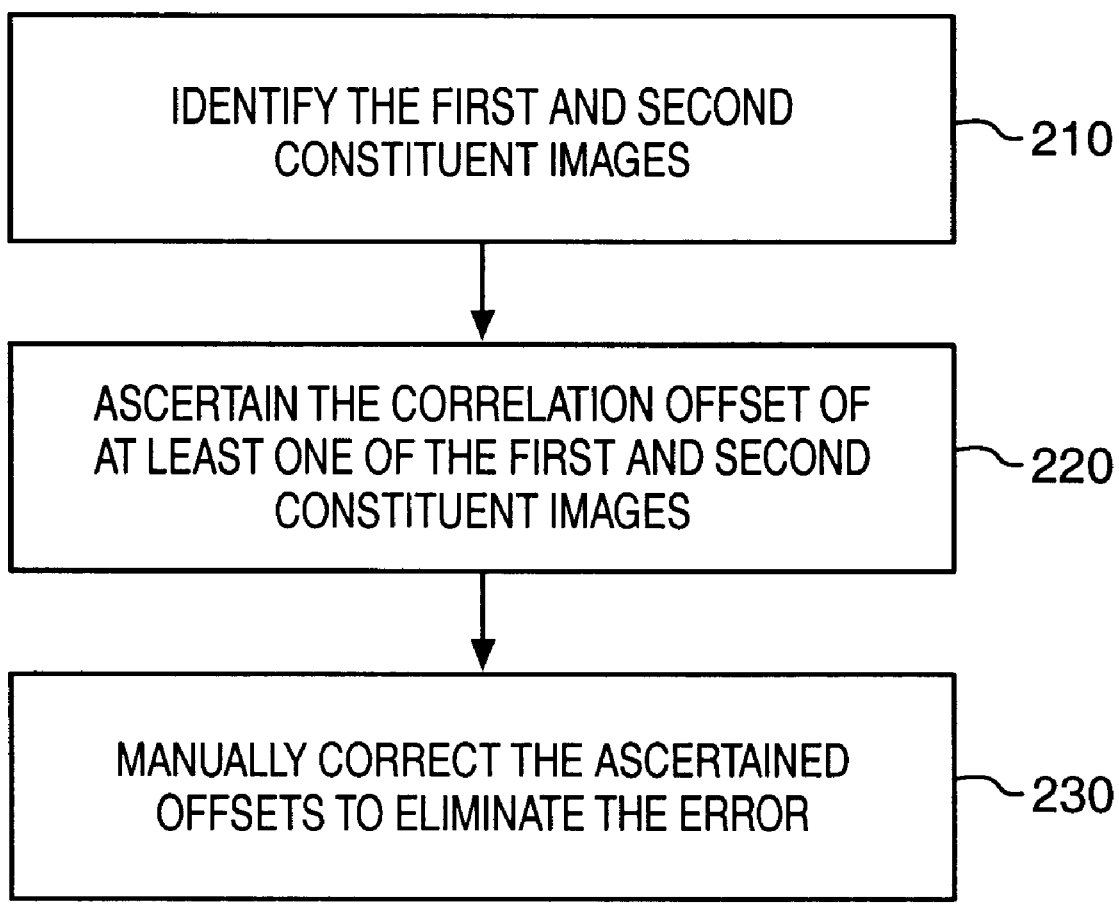
FIG. 2 generally illustrates a method in accordance with one embodiment of the invention.

FIG. 2 illustrates one method in accord with the present invention for correcting a correlation error in a composite image thus generated. Referring now to both FIGS. 1 and 2, in this particular embodiment, the method begins at step 210 by identifying the first constituent image 10 and the second constituent image 14 whose mis-correlation caused the error. Next, at step 220, the correlation offset of at least one of the first constituent image 10 and the second constituent image 14 is ascertained. Finally, at step 230 the ascertained correlation offset is manually corrected to eliminate the error. The manually corrected correlation offset, once implemented in the composite image 18, will eliminate the ghosted artifact 24, render the seam 20 undetectable, and create a more aesthetically pleasing and useful composite image 18.

Figure 3:
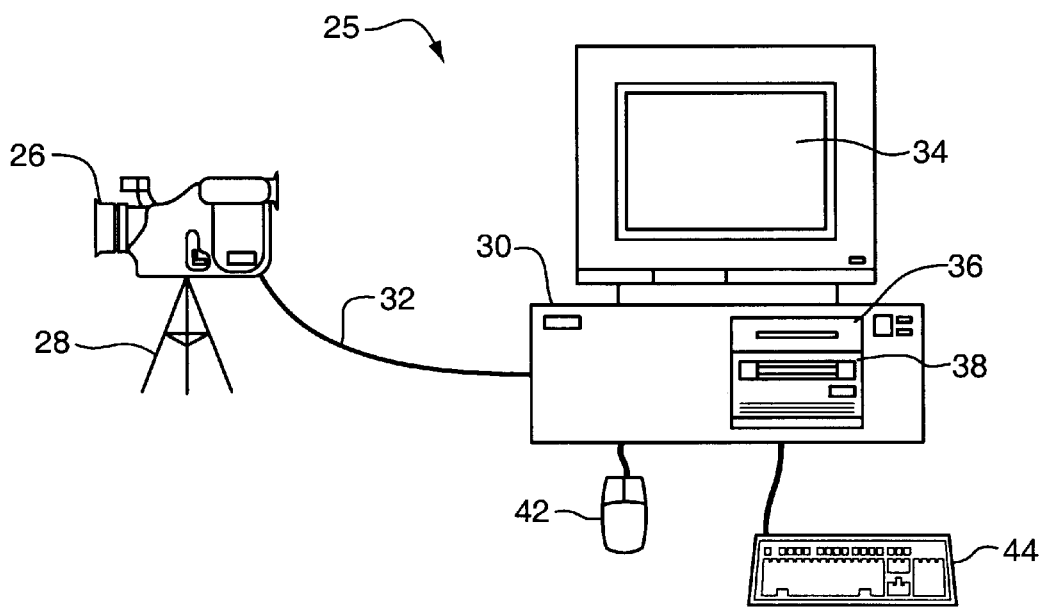
FIG. 3 depicts an apparatus as may be used to implement the invention in one embodiment.

In one particular embodiment of the method in FIG. 2, the composite image 18 is generated and displayed on a computer such as the computer 30 of the apparatus 25 in FIG. 3. In one particular embodiment, the computer 30 employs a graphical user interface ("GUI") operating system such as WINDOWS® 95 or WINDOWS® NT manufactured and sold by the Microsoft Corporation of Redmond, Wash. However, the invention is not so limited as a variety of operating systems may be suitable for this purpose. The computer 30 is programmed to implement the invention as disclosed below and the user interacts with the computer 30 to control the process through the GUI and a variety of peripheral devices.

The composite image 18 containing the correlation error is displayed by the computer 30 on the monitor 34 using the GUI. The user then selects a group of discrete picture elements, known as "pixels," containing the correlation error using the mouse 42. The computer 30 then determines which constituent images were used to generate this portion of the composite image 18 and ascertains their correlation offsets. One way to do this is to store a listing of the constituent images and their correlation offsets while generating the composite image and then consult this stored information during the correction process.

The constituent images 10 and 14 are then displayed for the user, either in or out of the context of the composite image 18. The user can then employ the mouse 42 or direction keys of the keyboard 44 to correct the one or more of the associated correlation offsets until the subject matter of the constituent images 10 and 14 is properly correlated. Conceptually, this may be pictured, and graphically presented via the GUI on the computer 30, as sliding the constituent images 10 and 14 back and forth until achieving the proper correlation. The computer 30 then determines the new correlation offsets and implements them in the composite image 18.

Typically, although not necessarily in all embodiments, the correction of correlation errors as set forth with respect to FIG. 2 is part of a larger process for generating a composite image. This larger process generally also includes capturing the constituent images for use in generating the composite image. Such an embodiment is discussed below in connection with the apparatus 25 illustrated in FIGS. 2–3 to perform the method illustrated in FIGS. 6A–6B.

The constituent images 10 and 14 may be captured and the composite image 18 generated using the apparatus 25 of FIG. 3. The apparatus 25 in this particular embodiment generally includes a camera 26 rotatably mounted on a tripod 28 and a computer 30 linked to the camera 26 by a cable 32. Note, however, that the invention is not so limited as many variations in the apparatus 25 may be encountered in various alternative embodiments.

The camera 26 in the embodiment illustrated is a video camera that captures a given scene in analog video footage comprising a sequence of images that are transmitted to the computer 30 over the cable 32. Again, however, the invention is not so limited. The camera 26 may convert the analog video images to digital form, i.e., "digitize" the video images, before transmitting them to the computer 30. One video camera having this capability is the Connectix QUICKCAM™ manufactured and sold by Connectix Corporation of San Mateo, Calif. Other embodiments may even use a still camera to capture the images in either analog or digital form for transmission to the computer 30.

The cable 32 may be any suitable medium known to the art. In the particular embodiment illustrated, the cable 32 is a coaxial cable as is commonly used in audio-visual multimedia systems. However, other media, such as optical fibers or wires, may alternatively be used. Note that the bandwidth of the media vary considerably and may be an important consideration in some embodiments depending on the type of camera 26. Note also that the cable 32 may be omitted altogether in some embodiments wherein the video footage is transmitted wirelessly through an infrared ("IR") interface or where the video footage is stored on video-tape for later playback using a tape drive.

Figure 4:
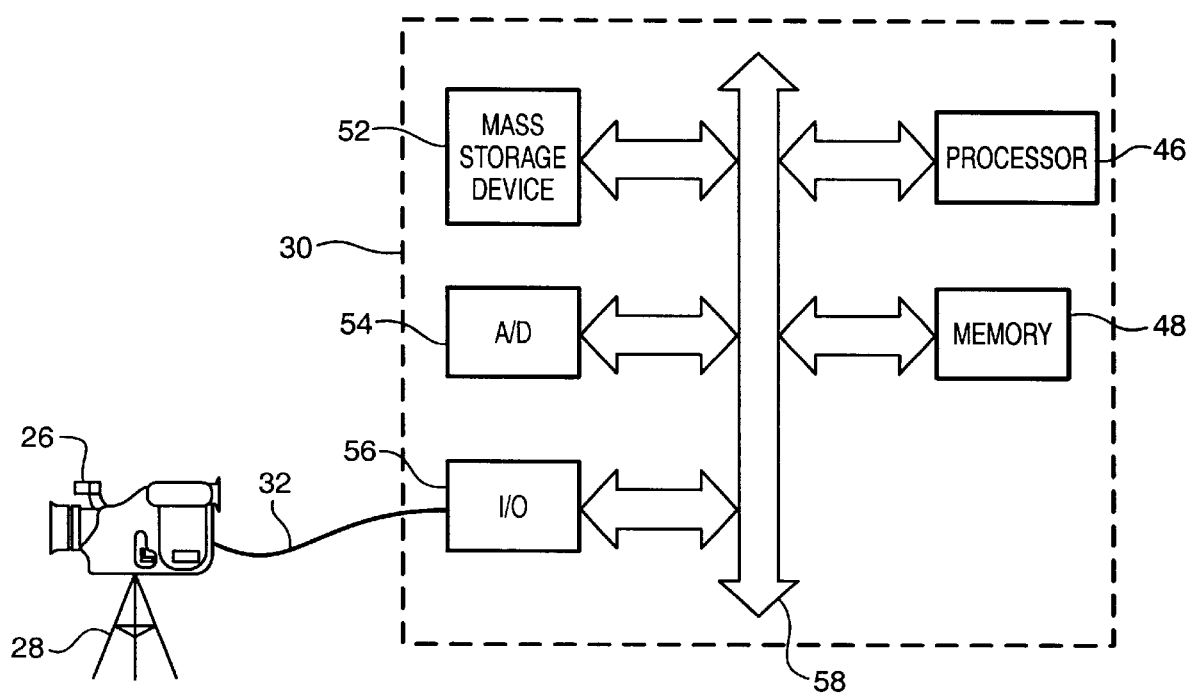
FIG. 4 conceptually illustrates several components of the apparatus of FIG. 3.

The computer 30 in this particular embodiment includes a variety of peripheral devices such as a monitor 34, a floppy disk drive 36, an optical disk drive 38, a hard disk drive (shown in FIG. 3), a mouse 42, and a keyboard 44, although the number and type of peripheral devices might vary in alternative embodiments. Turning to FIG. 4, the computer 30 also includes a processor 46, a memory 48, a mass storage device 52, an analog-to-digital ("A/D") converter 54, and an input/output ("I/O") interface 56, all of which communicate over a bus 58.

The processor 46 in FIG. 4 may be any suitable type of processor known to those in the art. Preferably, the processor 46 is a microprocessor with enhanced multi-media capabilities such as those manufactured and sold by Intel Corporation of Santa Clara, Calif. However, other types of processors such as digital signal processors ("DSPs") or graphics processors might be used in various alternative embodiments.

The memory 48 and the mass storage device 52 are part of the general memory subsystem of the computer 30. In the particular embodiment illustrated, memory 48 is the random access memory ("RAM") typically associated with the processor 46. The mass storage device 58 is a hard disk, an optical disk, or, less preferably, a floppy disk, and an associated drive.

The A/D converter 54 may be any digitizer known to the art depending on the particular embodiment being implemented. One particular embodiment employs a SMART VIDEO RECORDER III™ digitizer available from Intel Corporation or its distributors.

To capture constituent images, such as the constituent images 10 and 14 of FIG. 1, the camera 26 shown in FIG. 3 is swept across a scene (not shown) by rotating the camera 26 on the tripod 28, preferably in a horizontal plane, until the entire scene has been swept. This might include sweeping the camera 26 through an entire 360° to capture enough images to generate a large panoramic view. Alternative embodiments employing a still camera may simply take a number of overlapping still images. The camera 26 then transmits the video footage, in the form of a sequence of images known as "frames," to the computer 30 over the cable 32. Alternative embodiments might capture the video footage by recording it on a videotape for subsequent playback to the computer 30 using the camera 26 or some other videotape player such as a video-cassette recorder ("VCR").

Turning now to FIG. 4, the computer 30 receives the constituent images through its I/O interface 56. The I/O interface 56 may be serial or in parallel and may employ any number of communications standards depending on the particular embodiment implemented. The computer 30, in the illustrated embodiment, receives and processes the images received via the I/O interface 56 in accordance with a video capture program. The instructions for this program may be encoded on the mass storage device 52 and may be executed by the processor 46. One such program is ASYMETRIX DIGITAL VIDEO CAPTURE™ program available from Asymetrix Corporation of Bellevue, Wash. The images are digitized into discrete picture elements known as "pixels" by the A/D converter 54 and stored in individual image files in the mass storage device 52. The images may be stored in the image files using any suitable technique such as the joint photographic experts group ("JPEG"), the moving pictures expert group ("MPEG"), and the tagged image file format ("TIFF") standards.

The computer 30 then, under the control of a different software package, generates a composite image, such as the composite image 18, at the instruction of someone using the computer 30. The computer 30 sets aside a portion of memory in the mass storage device 52 for an image file holding the contents of the composite image. Two or more constituent images are then retrieved by accessing their image files in the mass storage device 52, correlating them on a pixel-by-pixel basis, pasting them together, and storing the result in the composite image file. Once the composite image is fully generated, it is displayed on the monitor 34, shown in FIG. 3, of the computer 30 so that correlation errors can be corrected.

Figure 5:
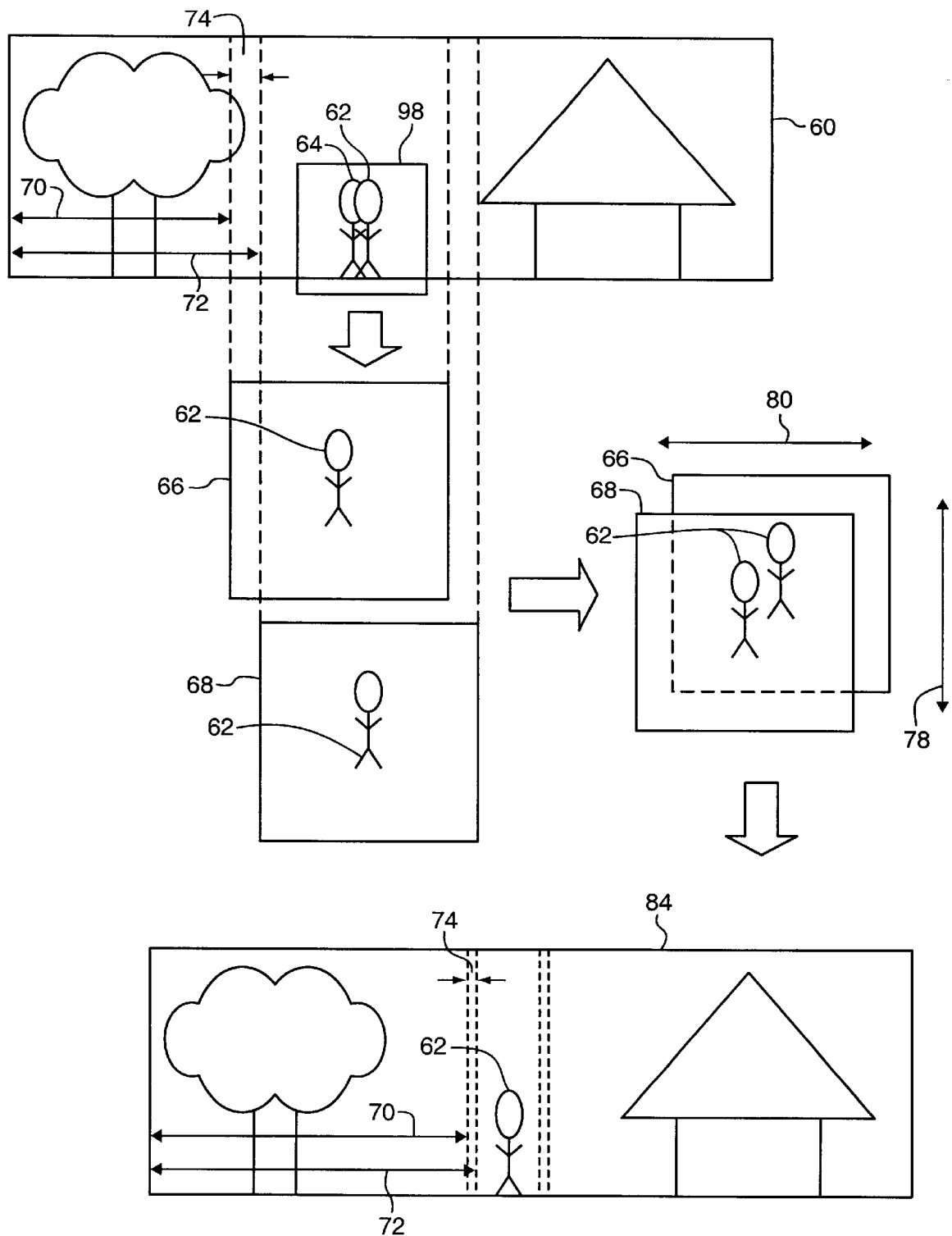
FIG. 5 graphically illustrates once particular embodiment of the method in FIG. 4.

FIG. 5 graphically illustrates one particular embodiment of the method of FIG. 2 as implemented on the computer 30 of FIGS. 3–4. The composite image 60 is a panoramic image generated by the method of FIGS. 6A–6B discussed further below and displayed on the monitor 34 of the computer 30. In this particular embodiment, the computer 30 employs a GUI operating system to display the composite image 60.

The composite image 60 contains a correlation error apparent from the subject 62 and the artifact 64. The correlation error was created by the mis-correlation of the first constituent image 66 and the second constituent image 68. The first constituent image 66 and the second constituent image 68 are pasted into the composite image 60 at a correlation offsets 70 and 72, respectively. Further, the second constituent image 68 is pasted into the composite image 60 at a relative offset 74 measured relative to the first constituent image 66.

Referring now to FIGS. 3 and 5, the user manually selects a group 98 of pixels including the correlation error, i.e., the object 62 and the artifact 64, using the mouse 42. The computer 30 then accesses the stored information regarding the correlation offsets of the various constituent images. From these correlation offsets and the associated frame identifiers, the computer 30 then determines that the correlation error was caused by the mis-correlation of the particular first and second constituent images 66 and 68.

The computer 30 then displays on the monitor 34 the first and second constituent images 66 and 68, one on top the other. The user then moves the first and second constituent images 66 and 68 relative to one another to manually correct the correlation error. This relative movement is preferably performed by first clicking the mouse 42 on one or the other of the first and second constituent images 66 and 68. The user then drags the selected image vertically, as indicated by the arrows 78, and/or horizontally, as indicated by the arrows 80, until the subjects 62 are aligned.

In effect, the user is correcting the relative offset 74 between the two constituent images 66 and 68. Conceptually, this process performs operations that are equivalent to sliding the two constituent images 66 and 68 back and forth until it is found that the subject 62 of the first constituent image 66 is substantially aligned with the subject 62 of the second constituent image 68. The correlation effectively alters the relative offset 74, which is a measure in pixels of how much the camera 26 (shown in FIGS. 3–4) moved between the capture of the first constituent image 66 and the capture of the second constituent image 68.

The computer 30 then determines the new relative offset 74 and calculates the corrected correlation offset 72. The computer 30 then stores the new correlation offsets 72 and 74 and re-pastes the constituent images 66 and 68 into the composite image 60 to create the corrected composite image 84. The corrected composite image 84 is then displayed. Note that, in some circumstances, the correction might create other errors such that the correction might need to be propagated to all correlation offsets to the right of correlation offset 72.

Figure 6A:
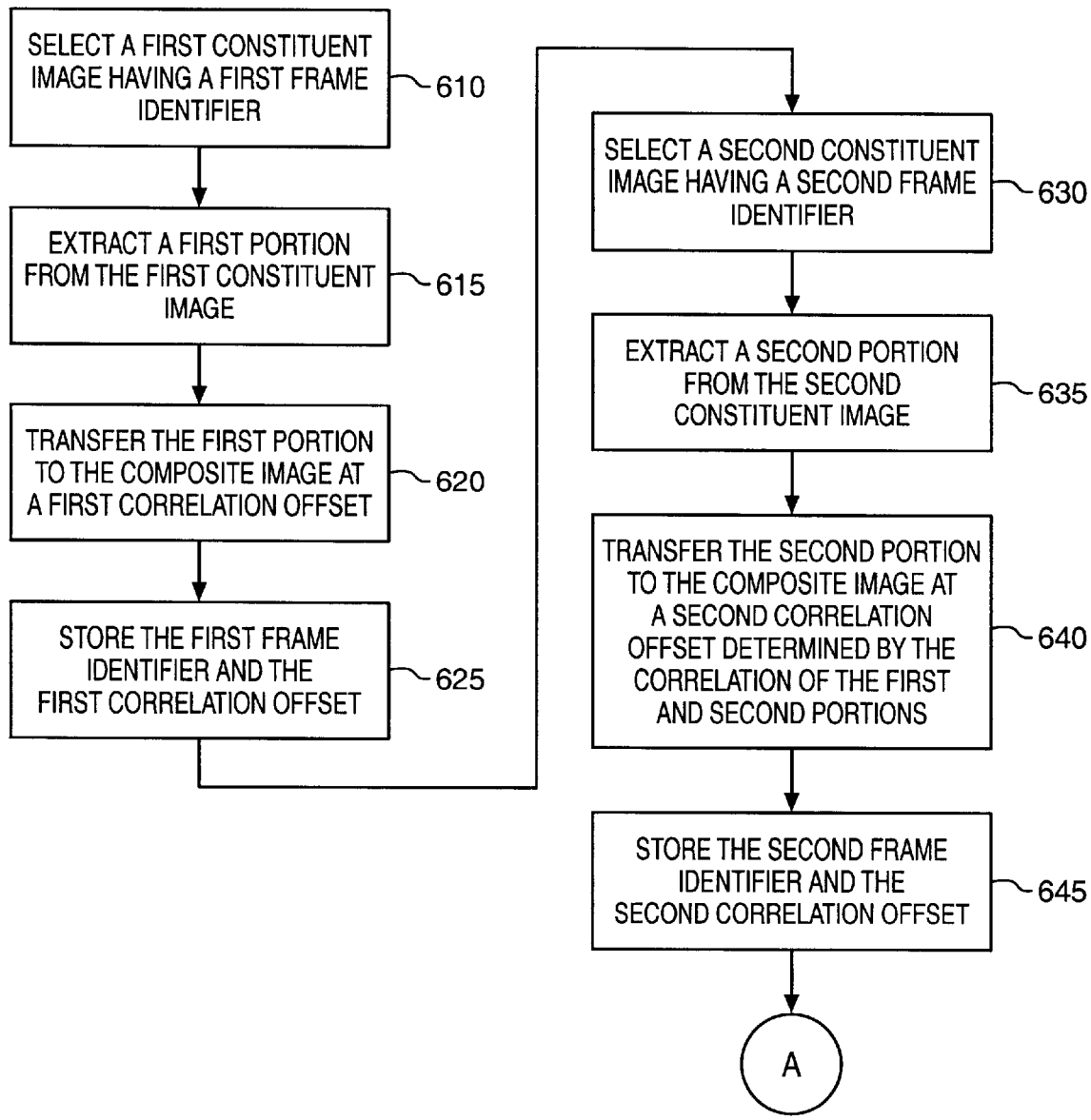
FIGS. 6A–6B conceptually illustrate a method in accordance with a second embodiment of the invention.
Figure 6B:
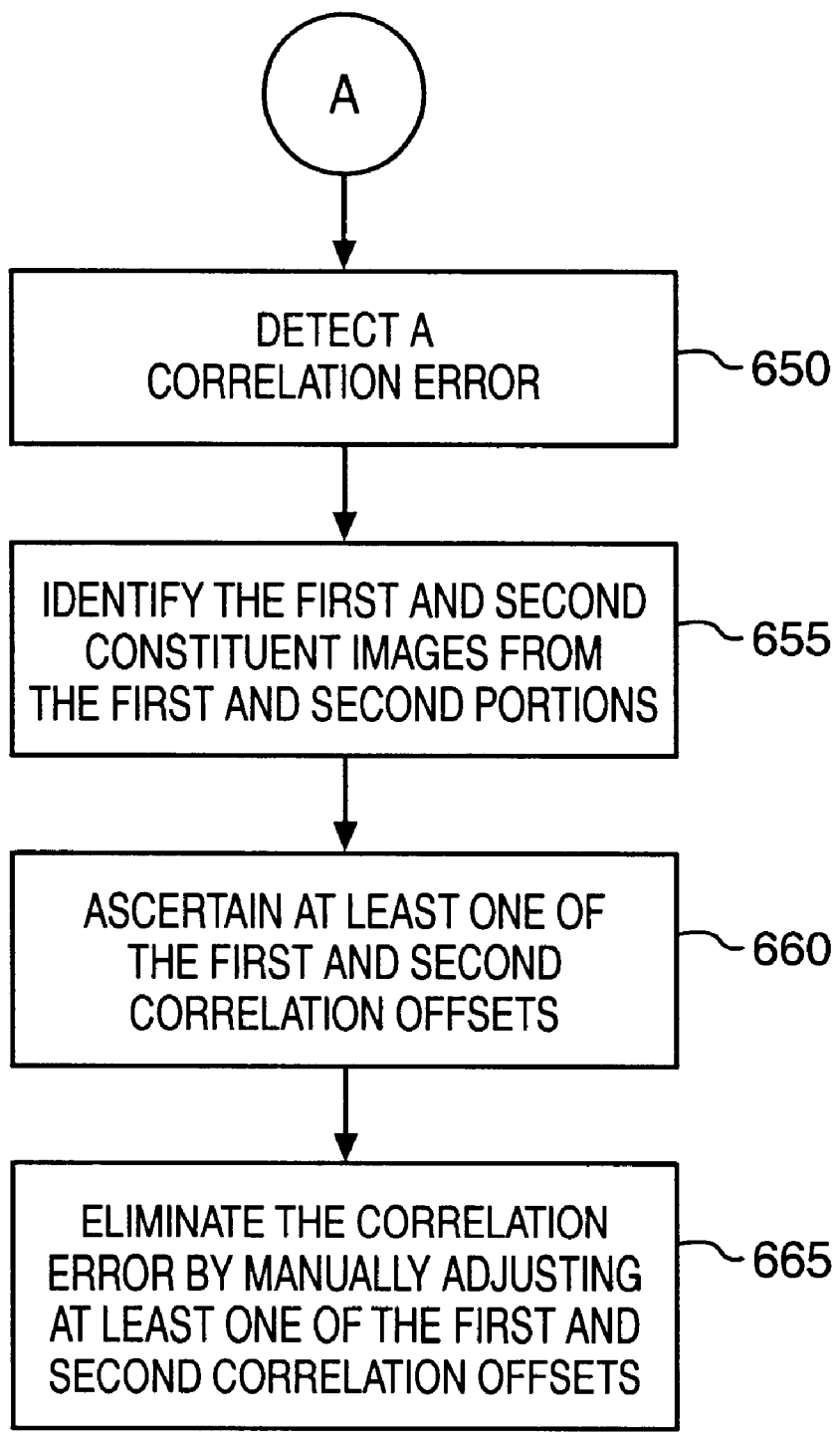

FIGS. 6A–6B illustrate one particular embodiment implementing this process in accord with the invention. The embodiment illustrated in FIGS. 6A–6B is extrapolated from the process for generating a composite image disclosed and claimed in application Ser. No. 08/728,130, filed in the name of Bradford H. Needham on Sep. 20, 1996, entitled "Method and Apparatus for Producing a Composite Image," and commonly assigned herewith. This application Ser. No. 08/728,130 is hereby incorporated by reference for all purposes.

Figure 7A:
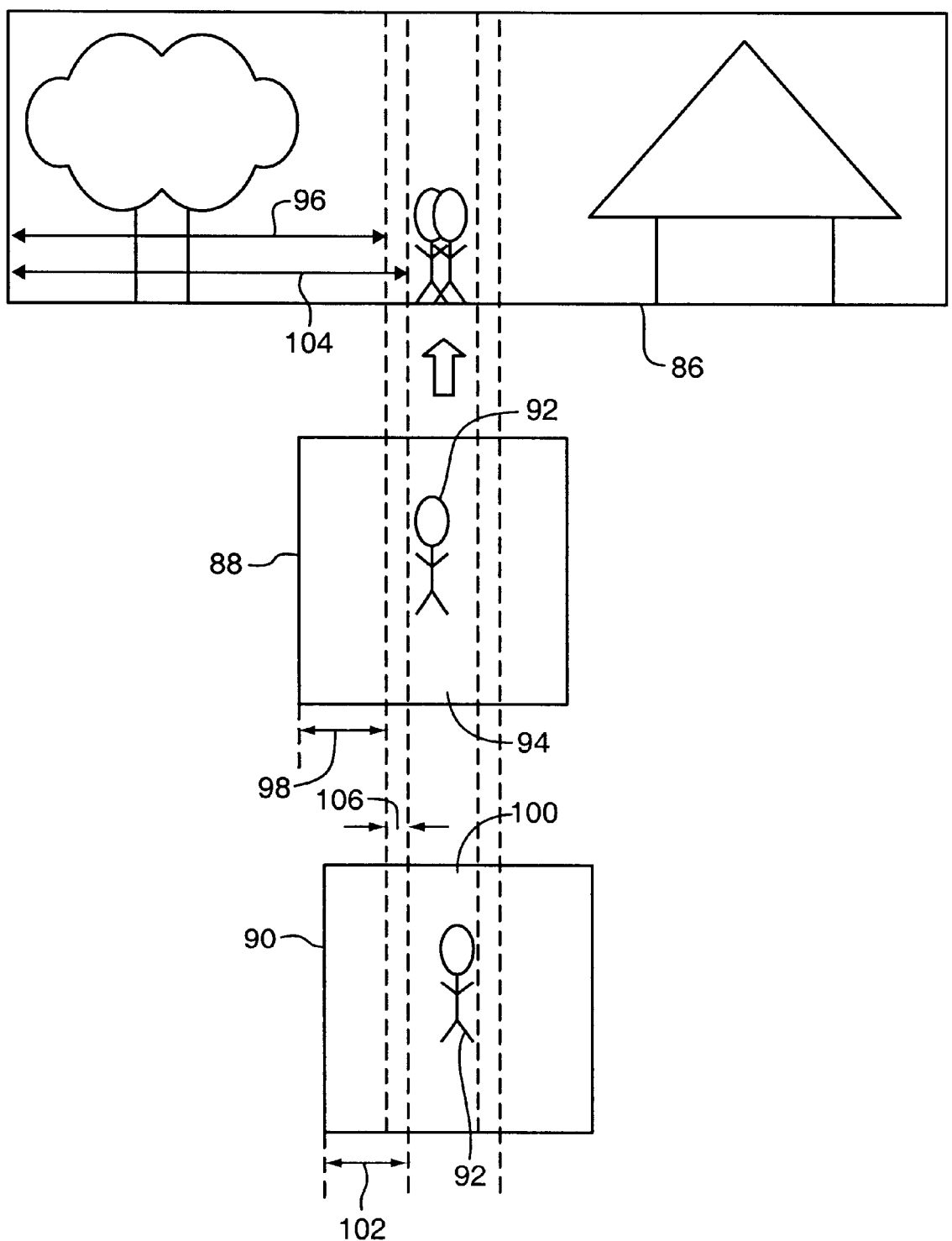
FIGS. 7A–7B graphically illustrate one implementation of the method of FIGS. 6A–6B.

The method of FIGS. 6A–6B shall be discussed relevant to the generation of composite image 86 in FIG. 7A from the constituent images 88 and 90 shown therein. At the beginning of the method in FIGS. 6A–6B, the composite image 86, the first constituent image 88, and the second constituent image 90 are digitized and stored in corresponding image files, and so are not visually perceptible. The representations of the composite image 86, the first constituent image 88, and the second constituent image 90 in FIG. 7A are conceptual only, and represent the contents of the respective digital image files.

Turning now to FIGS. 6A and 7A, at step 610 the computer 30 selects a first constituent image 88 including a subject 92. The first constituent image 88 has a first frame identifier (not shown) assigned to it at the time it is captured or at the time the digitized image is stored to an image file. The first constituent image 88 may be any image whose image file is stored in memory although specific applications may engender criteria preferring a particular image over the rest. For instance, one embodiment might prefer to select the constituent image that will define the left-most edge of the composite image 86. The frame identifier may be any unique identifier from which the computer 30 may retrieve the corresponding image file storing the digitized first frame. Thus, the frame identifier may be the address location at which the image file is stored or a sequential number stored with a pointer to the image file.

The step 615, the computer 30 next extracts a first portion 94 of the pixels in the first constituent image 88. The first portion will typically be a rectangular strip a few pixels wide and stretching the entire height of the first image, although this is not necessary to the practice of the invention. For instance, the first portion 94 in some embodiments may be sufficiently large so as to encompass the entirety of the first constituent image 88. The first portion 94 is usually lifted from the middle of the image, although this, too, is not necessary for the practice of the invention.

The first portion 94, at step 620 is then transferred to the composite image 86. The first portion 94 is pasted onto the composite image by storing the pixels to memory locations in the image file of the composite image 86 at a first correlation offset 96 relative to some predetermined point. In the embodiment illustrated, the predetermined point is the leftmost edge of the composite image 86. Note that, if the first constituent image 88 had been intended to form the left-most edge of the composite image 86, the correlation offset 98 would have been zero. Note also that, had the first portion 94 not been the first pasted into the composite image 86, the computer 30 would have had to correlate the first portion 94 with those portions previously pasted into the composite image 86 from other constituent images.

Still referring to FIGS. 6A and 7A, at step 625 the computer 30 then stores the first frame identifier and the first correlation offset in a separate file, for example. Some embodiments, as discussed below, might also store the dimensions of the first portion 94 and an extraction offset 98 that can later be used to determine more directly which pixels in the first constituent image 88 are included in the first portion 94.

At step 630, the computer 30 then selects a second constituent image 90 having a second frame identifier (not shown). The subject matter of the second constituent image 90 should overlap with that of the first constituent image 88 as shown in FIG. 7A. Thus, the identification and selection of the second constituent image 90 should depend to some degree on the identification of the first constituent image 88. The characteristics of the second frame identifier are the same as those for the first frame identifier set forth above.

At step 635, the computer 30 then extracts a second portion 100 from the second constituent image 90 at a second extraction offset 102. The second portion 100 is the same shape and size as the first portion 94 and the second extraction offset 102 is the same as the first extraction offset 98 in the embodiment illustrated. This may be preferable for some embodiments in that the computer 30 can extrapolate certain information during correlation error correction as set forth below without having to store the dimensions of the second portion 100 and the second extraction offset 102. However, this is not necessary to the practice of the invention.

The computer 30 next transfers, at step 640 the second portion 100 to the composite image 86 at a second correlation offset 104 determined by the correlation of the first and second portions 94 and 100. This part of the process may be conceptualized as including two parts. First, the computer 30 correlates the second portion 100 to the first portion 94 to determine the second correlation offset 104. Second, the computer 30 pastes the second portion 100 into the composite image 86 at the second correlation offset 104.

Several correlation processes are available for correlating the second portion 100 to the first portion 94 as is apparent from the reference *Digital Image Processing* by William Pratt, identified above. These processes generally calculate, or estimate, a relative offset 106 between the subject matter of the first portion 94 and that of the second portion 100. The relative offset 106, as will be recognized by those skilled in the art having the benefit of this disclosure, is created by the angular rotation of the camera 26, shown in FIGS. 3 and 4, between the capture of the first constituent image 88 and the second constituent image 90. One correlation process, as described in pseudo-code, is:

```
For a relative_offset = minimum_offset to maximum_offset:
    For all pixels, addressed x and y in an image:
        result = sum(previous_image[x,y] *
                     current_image[x+offset,y]).
    End for.
    Best fit = offset that produced the maximum result.
```

However, any suitable correlation process known in the art might be used. The relative offset is then used to estimate the second correlation offset 104 by adding the relative offset 106 to the previous correlation offset 96.

Once the correlation offset 104 is determined, the computer 30 pastes the second portion 100 into the composite image 86 at the second correlation offset 104. Again a variety of techniques might be employed. One technique is to stitch the second portion 100 onto the composite image 86 although the type of processing inherent in stitching is not necessary to the practice of the invention. In embodiments employing stitching, the pixels of the portion being transferred to the composite image 86 may be stitched using a weighted average blending process.

Returning now to FIG. 6A, at step 645 the second frame identifier and the second correlation offset 104 are stored in the same manner as the first frame identifier and the first correlation offset 96. Note that the first and second frame identifiers and the first and second correlation offsets 96 and 104 may be stored in a variety of manners. They may be stored as simple entries in a text file. Alternatively, they may be stored in a database of records, each record containing a field for the frame identifier, a field for the corresponding correlation offset, and a pointer to the record for the next identifier and offset. The manner in which this information is stored is not material to the practice of the invention and is implementation specific.

Thus, at this point in the process, the composite image 86 is stored and the correlation information for each of the constituent images 88 and 90 is stored. The computer 30 will typically output the composite image 86 in some manner, such as by displaying the composite image 86 on the monitor 34 of computer 30 in FIG. 3. Next, the correction of any correlation errors can begin.

Figure 7B:
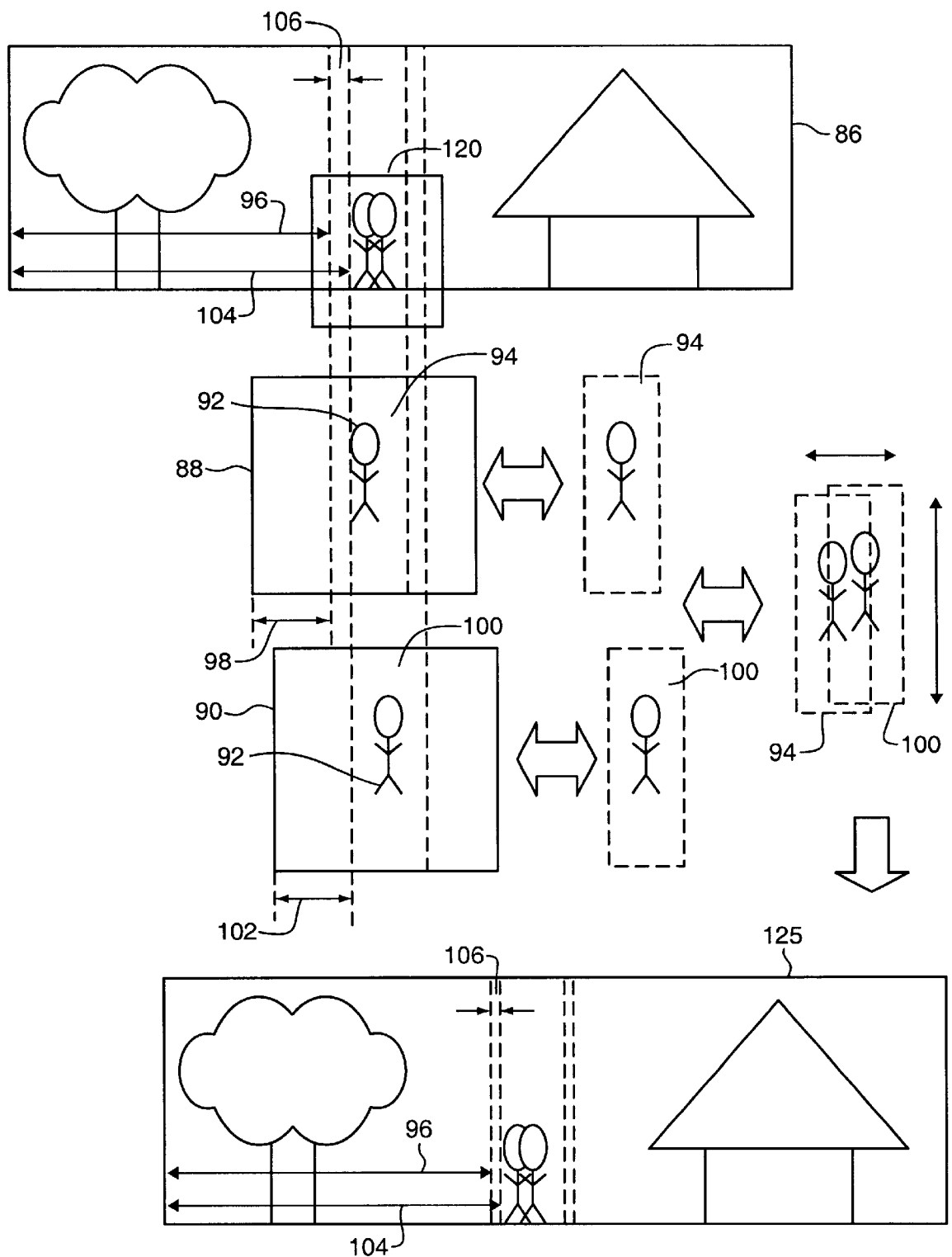

The correction of correlation errors in this particular embodiment is generally illustrated in FIG. 6B and is graphically illustrated in FIG. 7B. The correction is performed as is discussed above in connection with FIGS. 2 and 5. One significant exception is that the first and second portions 94 and 100 rather than the entire first and second constituent images 88 and 90 are manually re-correlated. First, at step 650, a correlation error is detected based upon user input which identifies a group of pixels containing the correlation Error. Then, at step 655, the computer 30 determines from the selected group of pixels 120 the identity of the first and second constituent frames 88 and 90 having pixels associated with the correlation error. The computer 30 additionally determines which pixels in the individual constituent frames 88 and 90 comprise the first and second portions 94 and 100 which have been transferred into the composite image 86. At step 660, at least one of the first and second correlation offsets are ascertained. This may be done in some embodiments by storing and accessing the extraction offsets 98 and 102 along with the correlation offsets 96 and 104 and frame identifiers. Finally, at step 665, the correlation error is eliminated.

The invention may generally be implemented in computer software designed for human interaction as is implied above. FIGS. 8A–8D are flow charts for one particular embodiment of a software implementation in accordance with the present invention. The detailed descriptions and representations herein are sometimes described in terms of a software and computer implemented invention. These terms are the means used by those skilled in the art to most effectively convey the substance of their work to others skilled in the art. A software implemented method is here, and is generally, conceived to be a self-consistent sequence of acts leading to a desired result. The acts require at some level physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, all of these and similar terms are to be associated with the appropriate physical quantities and are merely convenient labels applied to these quantifies. Unless specifically stated or as may otherwise be apparent from the above discussions, terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 8A:
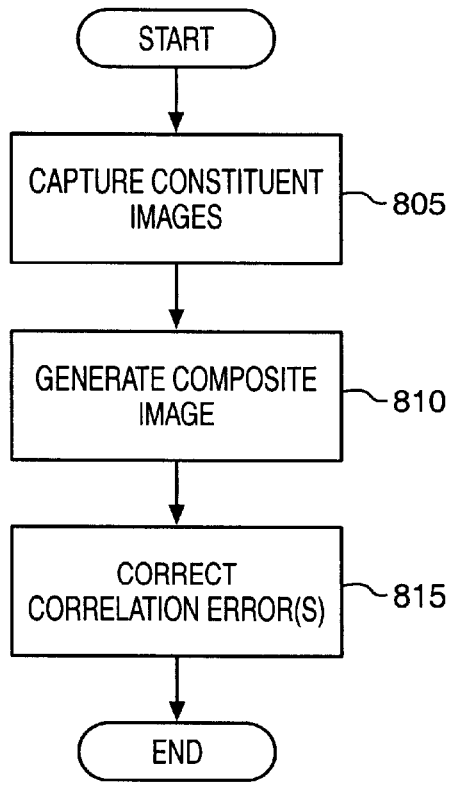
FIGS. 8A–8D comprise a flow chart for a software package implementing the method of FIGS. 6A–6B in one particular embodiment thereof.
Figure 8B:
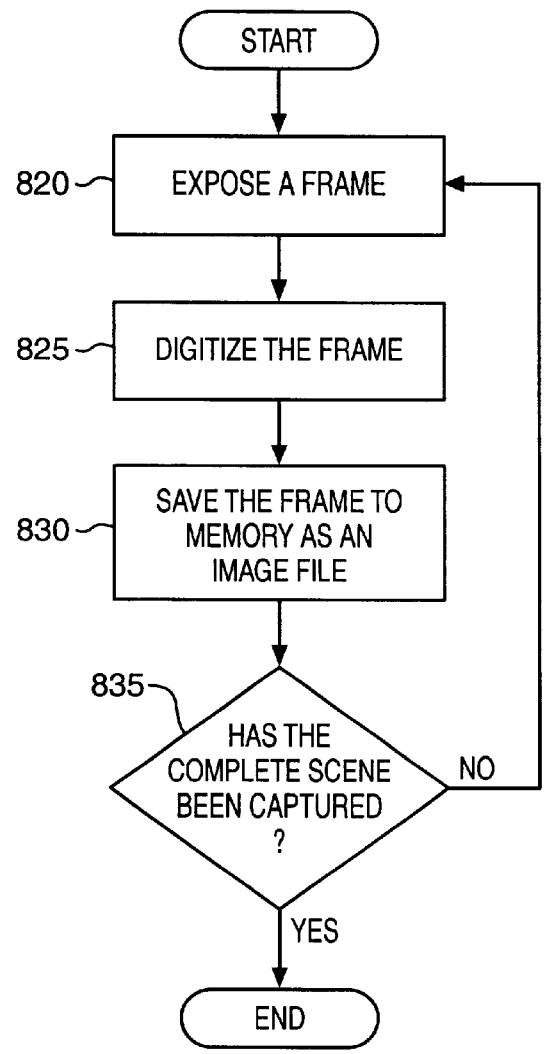
Figure 8C:
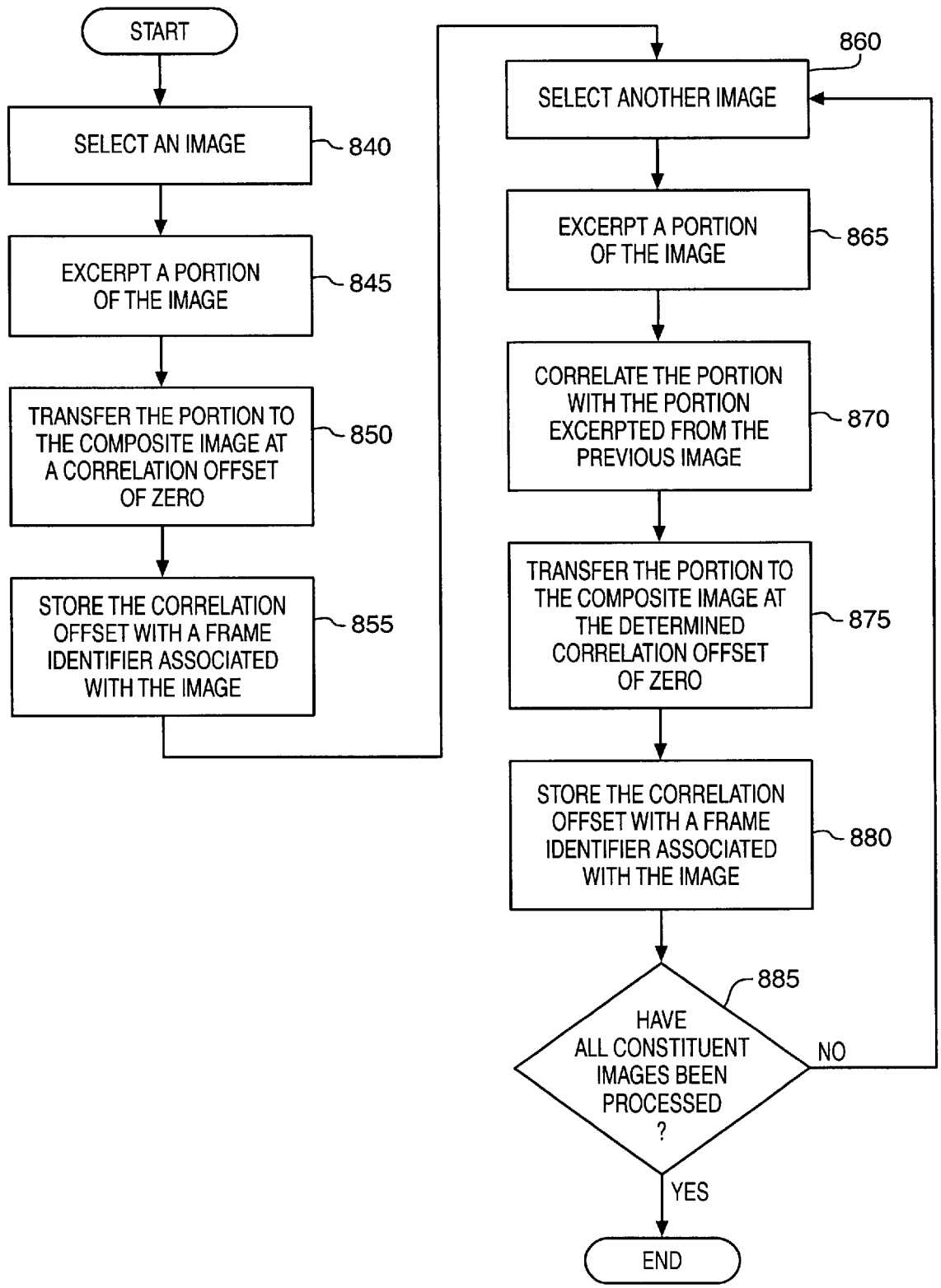
Figure 8D:
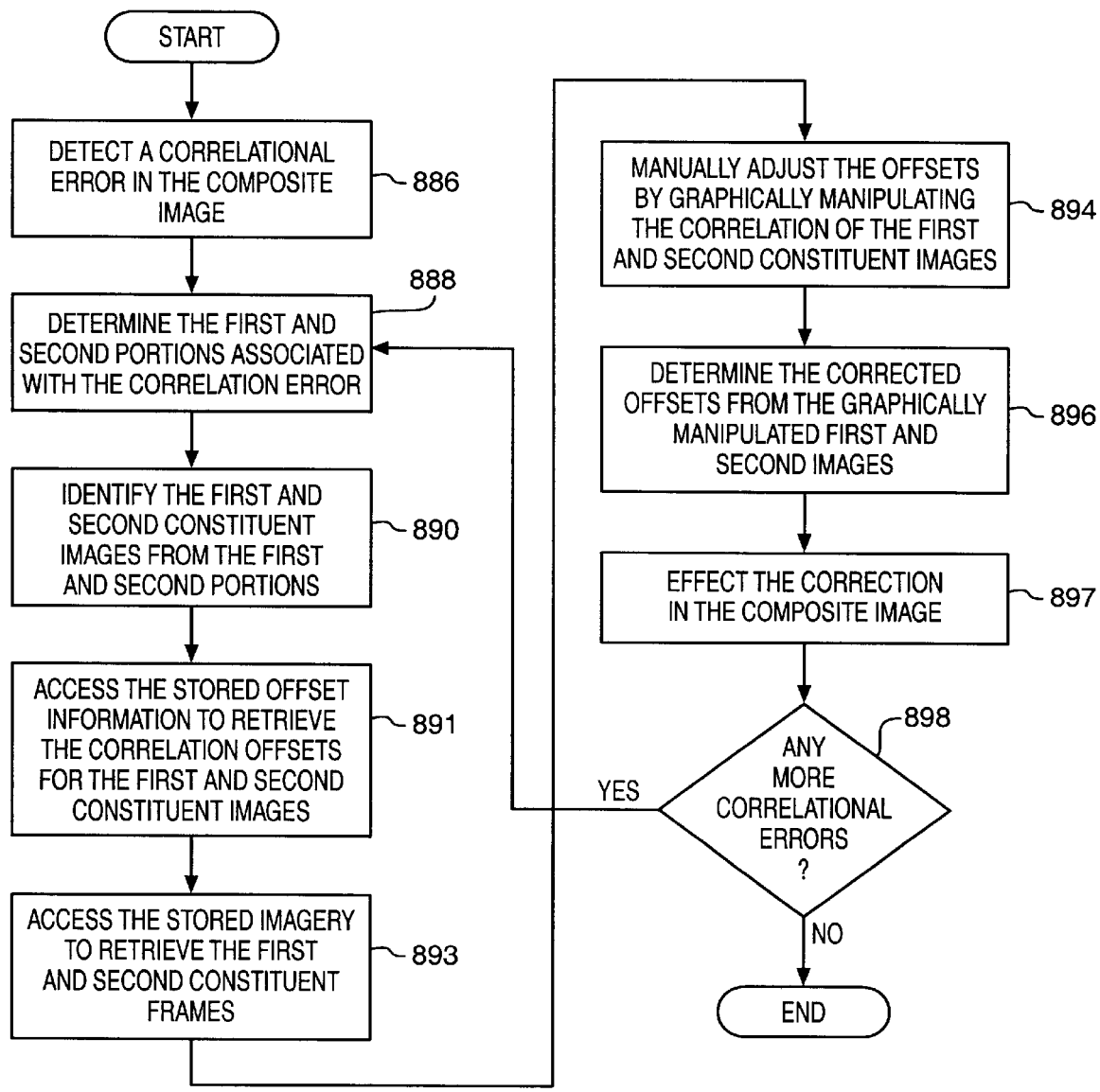

Returning to FIGS. 8A–8D, the particular embodiment illustrated therein may be separated into three parts as shown in FIG. 8A. First, the consistuent images are captured (step 805). As shown in FIG. 8B, this involves capturing individual frames, digitizing them, and saving them (step 825) to memory (step 830) as discussed above relative to FIGS. 3–4. Second, the composite image is generated (step 810) as illustrated in FIG. 8C and discussed above relative to FIGS. 5, 6A, and 7A. Third, the correlation errors are corrected (step 815) as shown in FIG. 8D and as discussed above relative to FIGS. 2, 5, 6B, and 7B. The software implementing the method of FIGS. 8A–8D may be encoded on any suitable program storage device such as mass storage device 52 in FIG. 4.

The invention is furthermore capable of many modifications within the scope and spirit thereof. One example is the determination of which pixels comprise the first and second portions 94 and 100, which determination will depend on the particular implementation. For instance, if the first and second extraction offsets 98 and 102 are defined to be equal, then this information need not be tracked during generation of the composite image 86. Similarly, if the first and second portions 94 and 100 are defined and are equal, then the dimensions need not be tracked during the generation of the composite image 86. If both the dimensions of the first and second portions 94 and 100 are equal and the first and second extraction offsets 98 and 102 are equal, then only the frame identifiers of the first and second constituent images 88 and 90 and the correlation offsets 96 and 104 need be tracked. Thus, the amount of information needed to manually correct the correlation errors will, in this sense, depend on the amount of flexibility designed into the generation of the composite image 86.

Furthermore, suppose the group of pixels 120 has been selected from the composite image 86 as set forth above. The listing of frame identifiers and correlation offsets may not be sorted, so the computer 30 will perform a linear search to identify the first and second constituent images 88 and 90. Once the first and second portions 94 and 100 have been identified, they are displayed on the monitor 34 of the computer 30.

If the user then slides the second portion 100 five pixels to the left to eliminate the correlation error, the second portion 100 may be widened by five pixels and the first portion 94 narrowed by five pixels to eliminate the correlation error while maintaining the overall dimensions of the group 120. This, in turn, facilitates the transfer of the correction back into the composite image 86. The relative offset 106 is consequently reduced by five pixels, and the computer 30 then reduces the correlation offset 104 by five pixels, which reduction is effected in the stored information for the second constituent image 90. The correction is then pasted back into the composite image 86 to create a corrected composite image 125. Note that, in some embodiments, corrections to offsets may have to propagated through the list of frame identifiers and correlation offsets.

The particular embodiments disclosed above are therefore illustrative only as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of correcting correlation errors in a composite image comprising:

receiving information identifying a correlation error in a portion of the composite image generated based upon a plurality of constituent images;

identifying a first constituent image and a second constituent image of the plurality of constituent images that were used to generate the portion of the composite image containing the correlation error;

ascertaining a current correlation offset of the first constituent image;

receiving correction information corresponding to the current correlation offset;

determining a corrected correlation offset for the first constituent image based upon the correction information and the current correlation offset; and creating a new composite image comprising a combination of the first constituent image and the second constituent image, in which the location of the first constituent image within the composite image is determined based upon the corrected correlation offset, and the first constituent image is moved until the first constituent image is substantially aligned with the second constituent image.

2. The method of claim 1, wherein the portion of the composite image is a group of pixels.

3. The method of claim 1, wherein the first constituent image has a first frame identifier.

4. The method of claim 3, wherein the first frame identifier is a unique identifier for retrieving a corresponding image file.

5. The method of claim 1, wherein the second constituent image has a second frame identifier.

6. The method of claim 5, wherein the second frame identifier is a unique identifier for retrieving a corresponding image file.

7. The method of claim 1, further comprising:

receiving information identifying the group of pixels containing the correlation error; and ascertaining those of the constituent images of the plurality of constituent images from which the group of pixels originated.

8. The method of claim 7, wherein the ascertaining those of the constituent images of the plurality of constituent images from which the group of pixels originated comprising:

accessing a data store of information that contains information about the plurality of constituent images; and determining which constituent images are associated with the group of pixels containing the correlation error.

9. The method of claim 1, wherein the receiving information identifying a correlation error is accomplished by way of a graphical user interface.

10. The method of claim 1, wherein at least one of the first and second constituent images comprises a portion extracted from a frame.

11. The method of claim 1, wherein the method is performed by a programmed computer.

12. The method of claim 1, wherein the current correlation offset is measured absolutely from a predetermined point in the composite image or relative to the predetermined point.

13. The method of claim 1, wherein the first and second constituent images are of equal size.

14. The method of claim 1, wherein the composite image comprises a panoramic image.

15. The method claim 1, further comprising:

capturing the first and second constituent images; and generating the composite image from the first and second constituent images.

16. The method of claim 1, wherein the moving the first constituent image comprising dragging the first constituent image in various directions.

17. The method of claim 1, wherein the moving the first constituent image comprising sliding the first constituent image in various directions.

18. A method of correcting correlation errors in a composite image comprising:

identifying a first constituent image and a second constituent image of a plurality of constituent images that were used to generate the composite image and identifying a group of pixels comprising the correlation error by receiving information identifying the group of pixels containing correlation error and ascertaining those of the constituent images from the plurality of constituent images from which the group of pixels originated;

ascertaining a current correlation offset of the first constituent image;

receiving correction information corresponding to the current correlation offset;

determining a corrected correlation offset for the first constituent image based upon the correction information and the current correlation offset; and eliminating the correlation error by creating a new composite image comprising a combination of the first constituent image and the second constituent image, in which the location of the first constituent image within the composite image is determined based upon the corrected correlation offset, and the first constituent image is dragged in various directions until the first constituent image is substantially aligned with the second constituent image.

19. The method of claim 18, wherein the ascertaining those of the constituent images from the plurality of constituent images from which the group of pixels originated comprising accessing a data store of information that contains information about the plurality of constituent images and determining which constituent images are associated with the group of pixels comprising the correlation error.

20. The method of claim 18, wherein the dragging comprising horizontal dragging.

21. The method of claim 18, wherein the dragging comprising vertical dragging.

22. A program storage medium encoded with instructions that, when executed by a computer, performs a method for correcting errors in a correlation of a first constituent image and a second constituent image transferred into a composite image at a first and a second correlation offset, respectively, the method comprising:

receiving information identifying a correlation error in a portion of the composite image generated based upon a plurality of constituent images;

identifying the first constituent image and the second constituent image of the plurality of constituent images that were used to generate the portion of the composite image containing the correlation error;

ascertaining a current correlation offset of the first constituent image;

receiving correction information corresponding to the current correlation offset;

determining a corrected correlation offset for the first constituent image based upon the correction information and the current correlation offset; and creating a new composite image comprising a combination of the first constituent image and the second constituent image, in which the location of the first constituent image within the composite image is determined based upon the corrected correlation offset, and the first constituent image is moved until the first constituent image is substantially aligned with the second constituent image.

23. The program storage medium of claim 22, wherein the portion of a composite image is a group of pixels.

24. The program storage medium of claim 22, wherein the first constituent image has a first frame identifier.

25. The program storage medium of claim 24, wherein the first frame identifier is a unique identifier for retrieving a corresponding image file.

26. The program storage medium of claim 22, wherein the second constituent image has a second frame identifier.

27. The program storage medium of 26, wherein the second frame identifier is a unique identifier for retrieving a corresponding image file.

28. The program storage medium of claim 22, further comprising:
   receiving information identifying the group of pixels containing the correlation error; and
   ascertaining those of the constituent images of the plurality of constituent images from which the group of pixels originated.

29. The program storage medium of claim 28, wherein the ascertaining those of the constituent images of the plurality of constituent images from which the group of pixels originated comprising:
   accessing a data store of information that contains information about the plurality of constituent images; and
   determining which constituent images are associated with the group of pixels containing the correlation error.

30. The program storage medium of claim 22, wherein the receiving information identifying a correlation error is accomplished by way of a graphical user interface.

31. The program storage medium of claim 22, wherein at least one of the first and second constituent images comprises a portion extracted from a frame.

32. The program storage medium of claim 22, wherein the method is performed by a programmed computer.

33. The program storage medium of claim 22, herein the correlation offset is measured absolutely from a predetermined point in the composite image or relative to the predetermined point.

34. The program storage medium of claim 22, wherein the first and second constituent images are of equal size.

35. The program storage medium of claim 22, wherein the composite image comprises a panoramic image.

36. The program storage medium of claim 22, further comprising:
   capturing the first and second constituent images; and
   generating the composite image from the first and second constituent images.

37. The program storage medium of claim 22, wherein the moving the first constituent image comprising dragging the first constituent image in various directions.

38. The program storage medium of claim 22, wherein the moving the first constituent image comprising sliding the first constituent image in various directions.

39. An apparatus for correcting errors in a composite image, the apparatus comprising:
   a display;
   a memory capable of storing digitized image files, a respective frame identifier for each image file, and at least one correlation offset for each frame identifier, the memory being encoded with instructions, that when executed, performs a method for correcting correlation errors in a composite image that has been generated based upon a plurality of constituent images, the method comprising:
   receiving information identifying a correlation error in the composite images;
   identifying a first constituent image and a second constituent image of the plurality of constituent images that were used to generate a portion of the composite image containing the correlation error;
   ascertaining a current correlation offset of the first constituent image;
   receiving correction information corresponding to the current correlation offset;
   determining a corrected correlation offset for the first constituent image based upon the correction information and the current correlation offset; and
   creating a new composite image comprising a combination of the first constituent image and the second constituent image, in which the location of the first constituent image within the composite image is determined based upon the corrected correlation offset, and the first constituent image is moved until the first constituent image is substantially aligned with the second constituent image
   a processor coupled to the memory and the display, the processor capable of executing the instructions; and
   an input device coupled to the processor.

40. The apparatus of claim 39, wherein the input device comprises a mouse or a keyboard.

41. The apparatus of claim 39, wherein the memory comprises a mass storage device.

42. The apparatus of claim 39, wherein the processor comprises one of a microprocessor, a digital signal processor, and a graphics processor.

43. A method of correcting correlation errors in a composite image comprising the steps of:
   a step for identifying a first constituent image and a second constituent image of a plurality of constituent images that were used to generate the composite image and identifying a group of pixels comprising the correlation error by receiving information identifying the group of pixels containing correlation error and ascertaining those of the constituent images from the plurality of constituent images from which the group of pixels originated;
   a step for ascertaining a current correlation offset of the first constituent image;
   a step for receiving correction information corresponding to the current correlation offset;
   a step for determining a corrected correlation offset for the first constituent image based upon the correction information and the current correlation offset; and
   a step for eliminating the correlation error by creating a new composite image comprising a combination of the first constituent image and the second constituent image, in which the location of the first constituent image within the composite image is determined based upon the corrected correlation offset, and the first constituent image is dragged in various directions until the first constituent image is substantially aligned with the second constituent image.

44. The method of claim 43, the step for identifying the first constituent image and the second constituent image of the plurality of constituent images further comprising the step for accessing a data store of information that contains information about the plurality of constituent images and determining which constituent images are associated with the group of pixels comprising the correlation error.

45. The method of claim 43, wherein the step for eliminating the correlation error by creating a new composite image further comprising the step for horizontally dragging the first constituent image until the first constituent image is substantially aligned with the second constituent image.

46. The method of claim 43, wherein the step for eliminating the correlation error by creating a new composite image further comprising the step for vertically dragging the first constituent image until the first constituent image is substantially aligned with the second constituent image.

47. A method of correcting correlation errors in a composite image comprising:
   receiving information identifying a correlation error in a portion of the composite image from an end-user, wherein the portion of the composite image comprises a plurality of constituent images;
   identifying a first constituent image and a second constituent image of the plurality of constituent images that were used to generate the portion of the composite image containing the correlation error;
   ascertaining a current correlation offset of the first constituent image;
   receiving correction information corresponding to the current correlation offset from the end-user;
   determining a corrected correlation offset for the first constituent image based upon the correction information and the current correlation offset; and
   creating a new composite image by manually eliminating the correlation error.

48. The method of claim 47, wherein the creating the new composite image by manually eliminating the correlation error comprises re-locating the first constituent image within the composite image based on the corrected correlation offset until the first constituent image is substantially aligned with the second constituent image.

49. The method of claim 48, wherein the re-locating the first constituent image comprises sliding the first constituent image until the first constituent image is substantially aligned with the second constituent image.

50. The method of claim 48, wherein the re-locating the first constituent image comprises dragging the first constituent image until the first constituent image is substantially aligned with the second constituent image.

51. The method of claim 48, wherein the re-locating the first constituent image comprises pasting the first constituent image until the first constituent image is substantially aligned with the second constituent image.

52. A method of correcting correlation errors in a composite image comprising the steps of:
   a step for receiving information identifying a correlation error in a portion of the composite image from an end-user, wherein the portion of the composite image comprises a plurality of constituent images;
   a step for identifying a first constituent image and a second constituent image of the plurality of constituent images that were used to generate the portion of the composite image containing the correlation error;
   a step for ascertaining a current correlation offset of the first constituent image;
   a step for receiving correction information corresponding to the current correlation offset from the end-user;
   a step for determining a corrected correlation offset for the first constituent image based upon the correction information and the current correlation offset; and
   a step for creating a new composite image by manually eliminating the correlation error.

53. The method of claim 52, wherein the step for creating a new composite image by manually eliminating the correlation error comprises a step for relocating the first constituent image within the composite image based on the corrected correlation offset until the first constituent image is substantially aligned with the second constituent image.

54. The method of claim 53, wherein the step for re-locating the first constituent image comprises a step for sliding the first constituent image until the first constituent image is substantially aligned with the second constituent image.

55. The method of claim 53, wherein the step for re-locating the first constituent image comprises a step for dragging the first constituent image until the first constituent image is substantially aligned with the second constituent image.

56. The method of claim 53, wherein the step for re-locating the first constituent image comprises a step for pasting the first constituent image until the first constituent image is substantially aligned with the second constituent image.

57. A method of correcting correlation errors in a composite image comprising the steps of:
   a step for receiving information identifying a correlation error in a portion of the composite image generated based upon a plurality of constituent images;
   a step for identifying a first constituent image and a second constituent image of the plurality of constituent images that were used to generate the portion of the composite image containing the correlation error;
   a step for ascertaining a current correlation offset of the first constituent image;
   a step for receiving correction information corresponding to the current correlation offset;
   a step for determining a corrected correlation offset for the first constituent image based upon the correction information and the current correlation offset; and
   a step for creating a new composite image comprising a combination of the first constituent image and the second constituent image, in which the location of the first constituent image within the composite image is determined based upon the corrected correlation offset, and the first constituent image is moved until the first constituent image is substantially aligned with the second constituent image.

58. The method of claim 57, further comprising the steps of:
   a step for receiving information identifying the group of pixels containing the correlation error; and
   a step for ascertaining those of the constituent images of the plurality of constituent images from which the group of pixels originated.

59. The method of claim 58, wherein the step for ascertaining those of the constituent images of the plurality of constituent images from which the group of pixels originated comprising the steps of:
   a step for accessing a data store of information that contains information about the plurality of constituent images; and
   a step for determining which constituent images are associated with the group of pixels containing the correlation error.

* * * * *

UNITED STATES PATENT AND TRADEMARK OFFICE
CERTIFICATE OF CORRECTION

PATENT NO. : 6,611,629 B2
DATED : August 26, 2003
INVENTOR(S) : Bender et al.

It is certified that error appears in the above-identified patent and that said Letters Patent is hereby corrected as shown below:

Column 7,
Line 22, delete "The" and insert -- At the --.

Column 13,
Line 40, delete "herein" and insert -- wherein --.

Column 14,
Line 64, insert -- wherein -- after "43," and before "the".

Signed and Sealed this

Eleventh Day of May, 2004

JON W. DUDAS
*Acting Director of the United States Patent and Trademark Office*